United States Patent
Lo

(10) Patent No.: US 9,052,878 B2
(45) Date of Patent: Jun. 9, 2015

(54) METHOD AND APPARATUS FOR PROVIDING STACKABLE HARD-DISK DRIVE CARRIER USING PULL-OUT DRAWERS

(75) Inventor: Jim Lo, Los Altos Hills, CA (US)

(73) Assignee: Netgear, Inc., Carlsbad, CA (US)

( * ) Notice: Subject to any disclaimer, the term of this patent is extended or adjusted under 35 U.S.C. 154(b) by 180 days.

(21) Appl. No.: 13/546,745

(22) Filed: Jul. 11, 2012

(65) Prior Publication Data
US 2014/0016262 A1    Jan. 16, 2014

(51) Int. Cl.
*G06F 1/16*    (2006.01)
*G06F 1/18*    (2006.01)

(52) U.S. Cl.
CPC ........................... *G06F 1/187* (2013.01)

(58) Field of Classification Search
CPC ........................................................ G06F 1/16
USPC ............................ 361/679.33, 679.39, 679.37
See application file for complete search history.

(56) References Cited

U.S. PATENT DOCUMENTS

| | | | | |
|---|---|---|---|---|
| 5,299,089 A | * | 3/1994 | Lwee | 361/679.33 |
| 5,319,519 A | * | 6/1994 | Sheppard et al. | 361/679.39 |
| 6,490,153 B1 | * | 12/2002 | Casebolt et al. | 361/679.33 |
| 7,639,492 B2 | * | 12/2009 | Thomas et al. | 361/679.37 |
| 8,226,341 B2 | * | 7/2012 | Largo | 411/439 |
| 8,369,080 B2 | * | 2/2013 | Huang | 361/679.38 |
| 8,531,828 B2 | * | 9/2013 | Tye et al. | 361/679.33 |

FOREIGN PATENT DOCUMENTS

GB         00381328 A    * 10/1931

* cited by examiner

*Primary Examiner* — Jayprakash N Gandhi
*Assistant Examiner* — Mandeep Buttar
(74) *Attorney, Agent, or Firm* — James M. Wu; JW Law Group

(57) ABSTRACT

A method and apparatus for providing a stackable hard-disk drive ("HDD") carrier using pull-out drawers and fasteners are disclosed. The carrier, in one embodiment, includes an inner case or drawer and an outer frame casing. The inner cage includes a base plate, a front cover, a first side panel, and a second side panel, wherein the first and second side panels are hinged to the base plate. The inner cage is configured to house a removable HDD. The first and second side panels also include fasteners for securing the HDD to the inner cage. The outer frame casing is configured to receive the inner cage via its two opposite guiding walls. The guiding walls are configured to allow extending the inner cage to a predefined distance from the outer frame casing for accessing the HDD.

19 Claims, 8 Drawing Sheets

METHOD AND APPARATUS FOR PROVIDING STACKABLE HARD-DISK DRIVE CARRIER USING PULL-OUT DRAWERS

FIELD

The present invention relates to computer storage system. More specifically, the present invention relates to hard-disk drive for memory storage.

BACKGROUND

Data storage is essential to digital processing systems including computers, smart phones, and/or network devices. With increasing demand of instant information over wired or wireless communication network, efficient and large capacity storage devices capable of storing voluminous files and applications are in high demand. One type of storage device such as hard-disk drive ("HDD") may be used to store digital information such as data, video, audio, and/or control information for one or more computers. For example, a digital processing system such as a computer may house an HDD for storage. Also, a conventional network attached storage ("NAS") system, which is another type of network storage device, may use one or more HDDs for data storage.

An HDD, also known as hard file and/or disk drive, contains one or more rotating discs coated with magnetic medium capable of storing digital information. A typical HDD can store relatively large amount data. To increase storage capacity, a conventional approach is to employ multiple HDDs wherein each HDD is engaged and enclosed in an HDD tray. Multiple HDD trays can be installed in a storage bay or unit.

A problem associated with a typical HDD or HDDs in a data storage system is that it is cumbersome to maintain, access, transport, and/or replace one or more HDDs partially due to the tools or equipments required. For example, to access or reach a HDD(s), a set of tools is typically required to install HDD(s) in a network storage system. Replacement or addition of HDD often involves a laborious installation procedure including opening system's physical enclosure to reach or access the HDD(s). In addition, conventional removable HDD trays are easily misplaced, lost, or mismatched.

SUMMARY

Embodiments of the present invention disclose a tool-less and tray-less device for carrying one or more hard-disk drive ("HDD"). The device includes an inner cage configured to contain the HDD and an outer frame casing configured to receive and interlocking with the inner cage. The inner cage, which is also known as a pull-out HDD drawer, has a base plate, a front cover, and two side panels. While the front cover is pivotally attached to the base plate, the two side panels are hinged to the two opposite edges of the base plate. Each side panel contains installing holes and channels where multiple fasteners are used to secure the side panel with an HDD. Each fastener, in one embodiment, includes an engaging pin which is used to extend the pin into a mounting hole of the HDD. The engaging pin, in one example, is configured to create a tight fit to the mounting hole to secure the HDD with the side panel without a need to rotating the fastener or screw. A portion of the inner cage, in one embodiment, can be manually pulled out to access the HDD such as installing and/or replacing the HDD. The outer frame casing includes guide slot to facilitate the movement of the inner cage.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
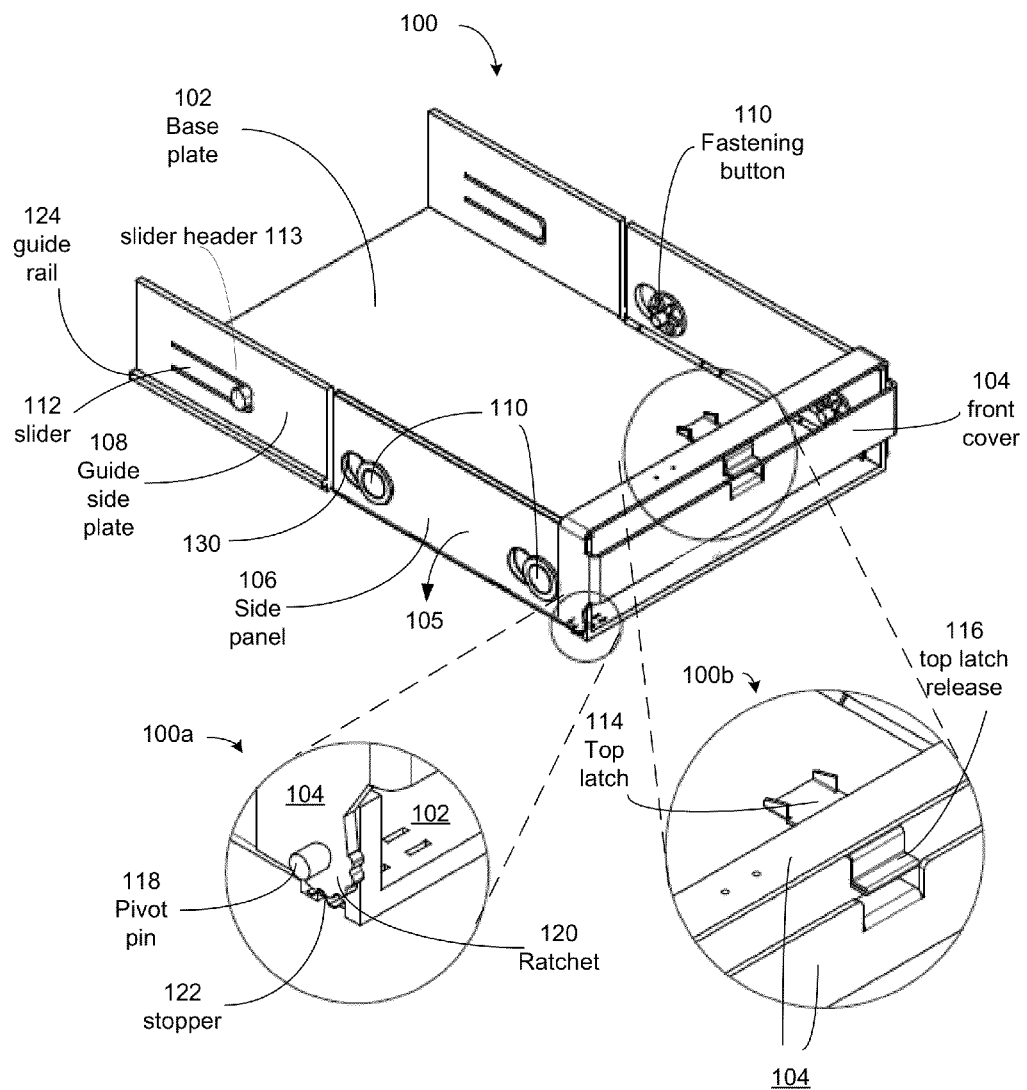
FIG. 1A illustrates an exemplary inner cage of an HDD carrier in accordance with one embodiment of the invention.

Exemplary embodiment(s) of the present invention is described herein in the context of a method, system and apparatus of a hard-disk drive ("HDD") carrier using pull-out drawer(s) and fasteners.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Embodiment(s) of the present invention discloses a toolless and tray-less HDD carrier using an inner cage and an outer frame casing. The inner cage is also known as a pull-out drawer or an HDD drawer. The inner cage includes a base plate, a front cover, a first side panel, and a second side panel, wherein the first and second side panels are hinged to the base plate. The inner cage is configured to house a removable HDD. The first and second side panels also include fasteners for securing the HDD to the inner cage. The outer frame casing is configured to receive the inner cage via its two opposite guiding walls. The guiding walls are configured to allow extending the inner cage to a predefined distance from the outer frame casing for accessing the HDD.

FIG. 1A illustrates an exemplary inner cage 100 of an HDD carrier in accordance with one embodiment of the invention. Inner cage 100 includes a base plate 102, a front cover 104, two opposite side panels 106 and two guide side plates 108. Inner cage 100, which can also be referred to as an HDD drawer, is configured to form a compartment for housing an HDD. The term "inner cage," "HDD drawer," and "drawer" are used interchangeably therein. It should be noted that the underlying concept of the exemplary embodiment(s) of the present invention would not change if one or more components (or units) were added to or removed from diagram 100.

Base plate 102 forms a base of inner cage 100 and has a front edge, back edge, left edge, and right edge. The front edge of base plate 102 is coupled with front cover 104 and the back edge of base plate 102 faces to the outer frame casing (not shown in FIG. 1A). Two side panels 106 are flexibly attached to the left and right edges (opposite across the width of base plate 102) adjacent to the front edge of base plate 102. Guide side plates 108, in one aspect, are affixed to the left and right edges of base plate 102 adjacent to side panels 106 wherein the guide side plates 108 are placed approximately perpendicular to base plate 102. Note that guide side plates 108 are situated toward the back edge of base plate 102 while side panels 106 are attached toward the front edge of base plate 102. In a closed situation as illustrated in diagram 100, base plate 102, guide side plates 108, side panels 106, and front cover 104 form a compartment which houses an HDD.

Front cover 104 is coupled to base plate 102 through swivel coupling as illustrated in an exploded drawing 100a. The swivel coupling includes a pivot pin 118, stopper 122, and ratchet 120. In one example, pivot pin 118 is located on base plate 102 and a pivot hole may be located in front cover 104. Alternatively, pivot pin 118 may be situated at front cover 104 while pivot hole may be created in base plate 102. In one embodiment, front cover 104 is held in a position through a position-locking component capable of interlocking with base plate 102.

Front cover 104 also includes a top latch 114 and a top latch release 116 as shown in an exploded drawing 100b. Top latch 114 is used to latch inner cage 100 to the outer frame casing (not shown in FIG. 1A) when front cover 104 is in the closed position. In one example, top latch release 116 is used to disengage or release inner cage 100 from the outer frame casing.

Side panels 106 are coupled to two opposite (or left and right) edges of base plate 102. Each side panel 106 is configured to pivot or swing alongside of the edge of base plate 102. A function of side panels 106 is to secure or anchor an HDD to inner cage 100. For example, when side panels 106 are situated in positions that are perpendicular to base plate 102, side panels 106 are capable of securing or anchoring an HDD to inner cage 100. Alternatively, when side panels 106 are swung outward in a direction indicated by numeral 105, side panels 106 release an HDD whereby the HDD can be removed or accessed. Accessing HDD refers to replacing HDD, adding HDD, removing HDD, adjusting HDD, and the like.

Figure 1C:
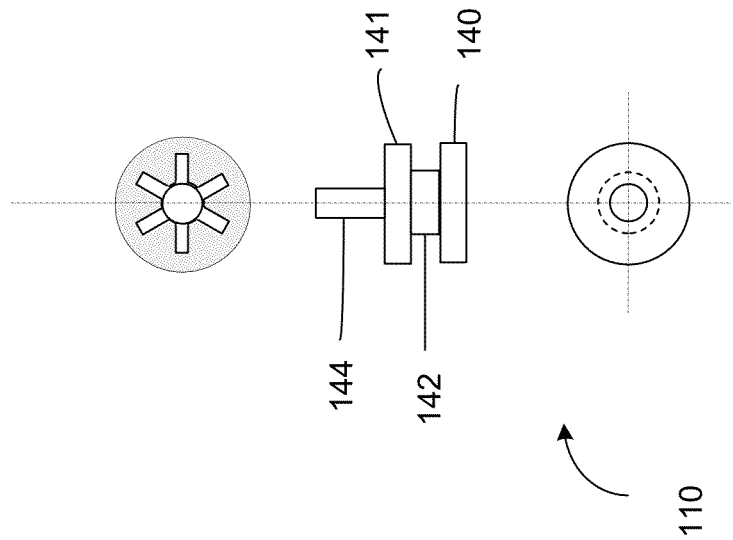
FIG. 1C is an exemplary schematic diagram showing a top view, a front view and a bottom view of a fastener 110 in accordance with one embodiment of the invention.
Figure 1B:
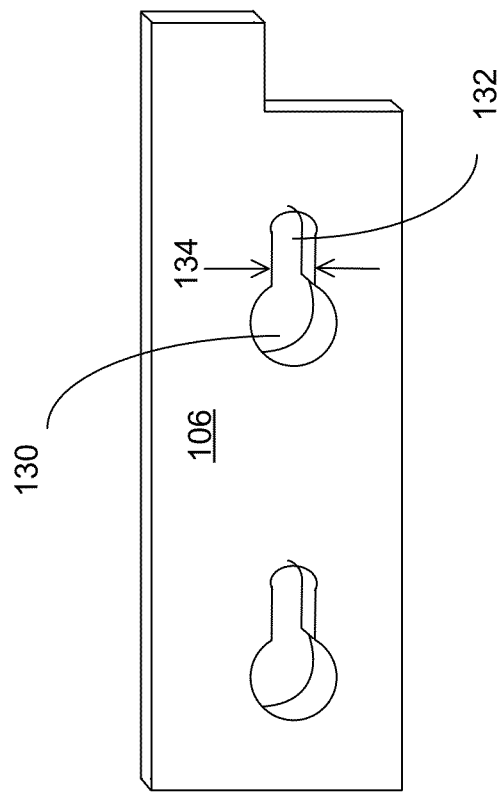
FIG. 1B is a schematic diagram showing an exemplary side plate with openings having holes and channels in accordance with one embodiment of the present invention.

To secure an HDD to inner cage 100 or pull-out drawer, multiple fasteners 110 are used to anchor the HDD. Fasteners 110, in one embodiment, are inserted at openings on side panels 106 as illustrated by FIGS. 1B-C. FIG. 1B is an exemplary schematic diagram illustrating a side panel 106 with two openings wherein each opening is shaped as a combination of hole 130 and channel 132. In one embodiment, holes 130 allow fasteners 110 to pass through while channels 132 provide a predefined movement of fasteners 110 for anchoring process.

FIG. 1C is an exemplary schematic diagram showing a top view, a front view and a bottom view of a fastener 110 in accordance with one embodiment of the invention. Fastener 110 includes a disk 140 connected to a column 142, an engaging pin 144 connected to column 142 and an internal serrated lock washer 141. The height of column 142 is configured to be less than the thickness of side panel 106. To attach fastener 110 to channel 132 (shown in FIG. 1B) of side panel 106, lock washer 141 and disk 140 are pressed towards each other to clamp on side panel 106. Width or diameter of column 142 is configured in accordance with channel width 134 which facilitates movement as well as positioning of fastener 110 during installation of HDD. In one example, the diameter of disk 140 is less than the size of hole 130, but it is greater than channel width 134.

Engaging pin 144 is a cylindrical structure configured to create a tight fit when it is inserted into a mounting hole of HDD. In accordance with one embodiment of the present invention, fastener is made of shock absorbing and/or vibration dampening materials whereby it can provide shock and/or vibration protection for the HDD(s). It should be noted that fastener 110 is not limited to the circular configuration as illustrated in FIG. 1C. Any geometrical configurations such as square cross-section engaging pins and circular disks can be used.

Refer back to FIG. 1A, guide side plates 108 are adjacent to side panels 106 and are affixed substantially perpendicular to base plate 102. In one embodiment, guide side plate 108 includes a spring-load slider 112 and a guide rail 124 configured to respectively couple to a guide slot and a groove in the outer frame casing (not shown in FIG. 1) to facilitate movements of inner cage 100 which is independent from the outer frame casing. Slider 112 includes a slider header 113 and a spring-loaded release wherein slider header 113 is able to couple to the guide slot of outer frame casing to provide a predefined distance for the inner cage to expend from the outer frame casing. Slider 112 also serves as a safety lock or stopper preventing inner cage 100 from unintentionally sliding out of the outer frame casing. It should be noted that inner cage 100 (or pull-out drawer) can be removed from the outer frame casing by pressing slider 112.

One advantage of employing inner cage 100 as an HDD drawer is that, unlike conventional HDD tray, inner cage 100 generally cannot be separated from the outer frame casing. Another advantage of using inner cage 100 is that tools and/or screws are not required to install and/or replacing an HDD from inner cage 100.

Figure 2B:
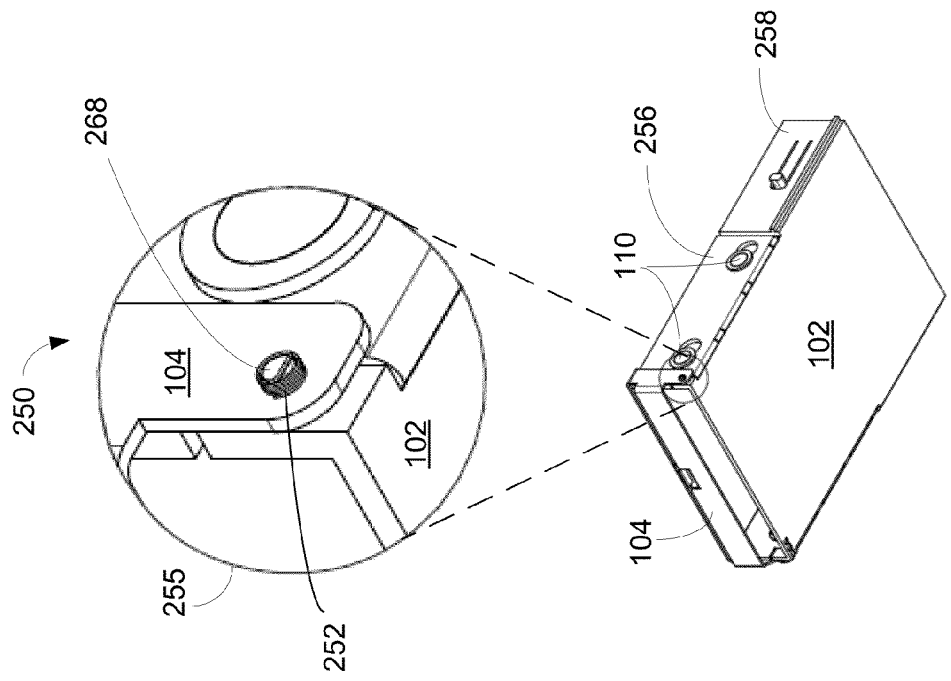
FIG. 2B is a perspective diagram viewed from a bottom left viewing angle illustrating an HDD drawer in accordance with one embodiment of the present invention.
Figure 2A:
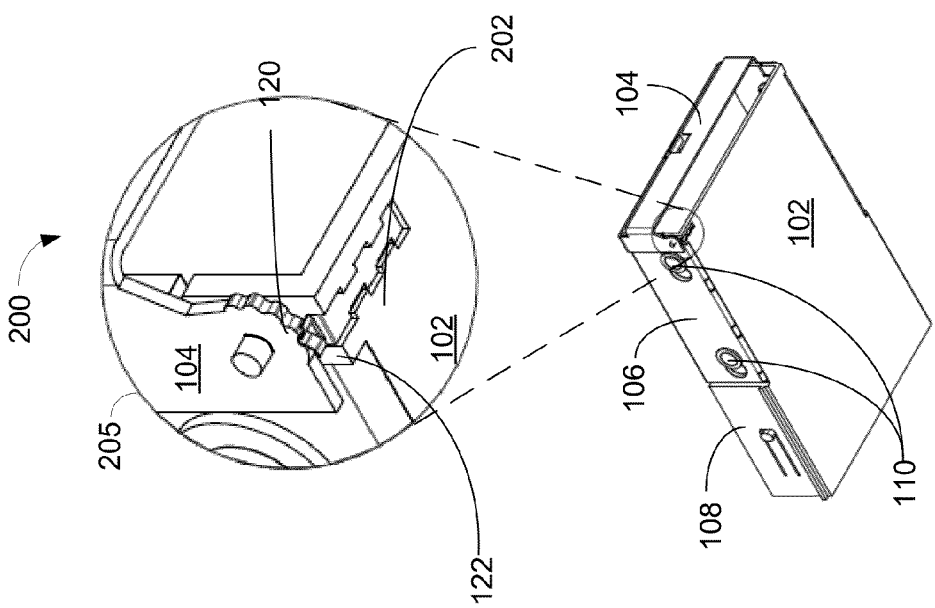
FIG. 2A is a perspective diagram viewed from a bottom right viewing angle illustrating an inner cage in accordance with one embodiment of the present invention.

FIG. 2A is a perspective diagram 200 viewed from a bottom right viewing angle illustrating an inner cage or HDD drawer in accordance with one embodiment of the present invention. The HDD drawer shown in diagram 200 includes a base plate 102, a front cover 104, a left side panel 106, and a left guide side plate 108. The exploded drawing illustrates an exemplary interlocking swivel coupling 205 between front cover 104 and base plate 102. It should be noted that the underlying concept of the exemplary embodiment(s) of the present invention would not change if one or more components (or units) were added to or removed from diagram 200.

Interlocking swivel coupling 205, in one aspect, includes various mechanical components, such as stopper 122, and ratchet notch 120, to facilitate movement of front cover 104 with respect to base plate 102. For example, stopper 122 may be fabricated by a piece of flexible material that is inserted into base plate 102 for stopping or holding front cover 104 in a certain position such as an opening or closing position. Alternatively, stopper 122, which may be spring-loaded, is engaged with a ratchet notch 120 for holding front cover 104 at an opening or closing position.

During a front cover opening operation, when front cover 104 is pulled away from the HDD drawer in an opening posture, stopper 122 is engaged by pushing down a cog next to the engaged ratchet notches. Note that engagement of stopper 122 and ratchet notches 120 allows front cover 104 to open outward and stay open in a desired position. Note that the term "outward" refers to moving front cover 104 away from base plate 102 and the term "inward" refers to retract front cover 104 closer to base plate 102.

An advantage of employing an interlocking swivel coupling 205 in an HDD drawer is that when front cover 104 is in close position, it interlocks with side panels 106 to reinforce securing the HDD to the drawer. Alternatively, when front cover 104 is in open position, it disengages from side panels 106 whereby exposing the HDD in the drawer for accessing.

FIG. 2B is a perspective diagram 250 viewed from a bottom left viewing angle illustrating an HDD drawer in accordance with one embodiment of the present invention. The HDD drawer includes a base plate 102, a front cover 104, a right side panel 256, and a right guide side plate 258. The exploded drawing illustrates an exemplary interlocking swivel coupler 255 between front cover 104 and base plate 102. Interlocking swivel coupler 255, in one embodiment, includes various mechanical moveable coupling components such as a torsion spring 252 and a pivot ping 268 used for facilitating opening or closing of front cover 104. It should be noted that swivel coupling 205 and swivel coupler 255 illustrated in FIGS. 2A and 2B can be used independently or in combination to facilitate movement of front cover 104.

Figure 3:
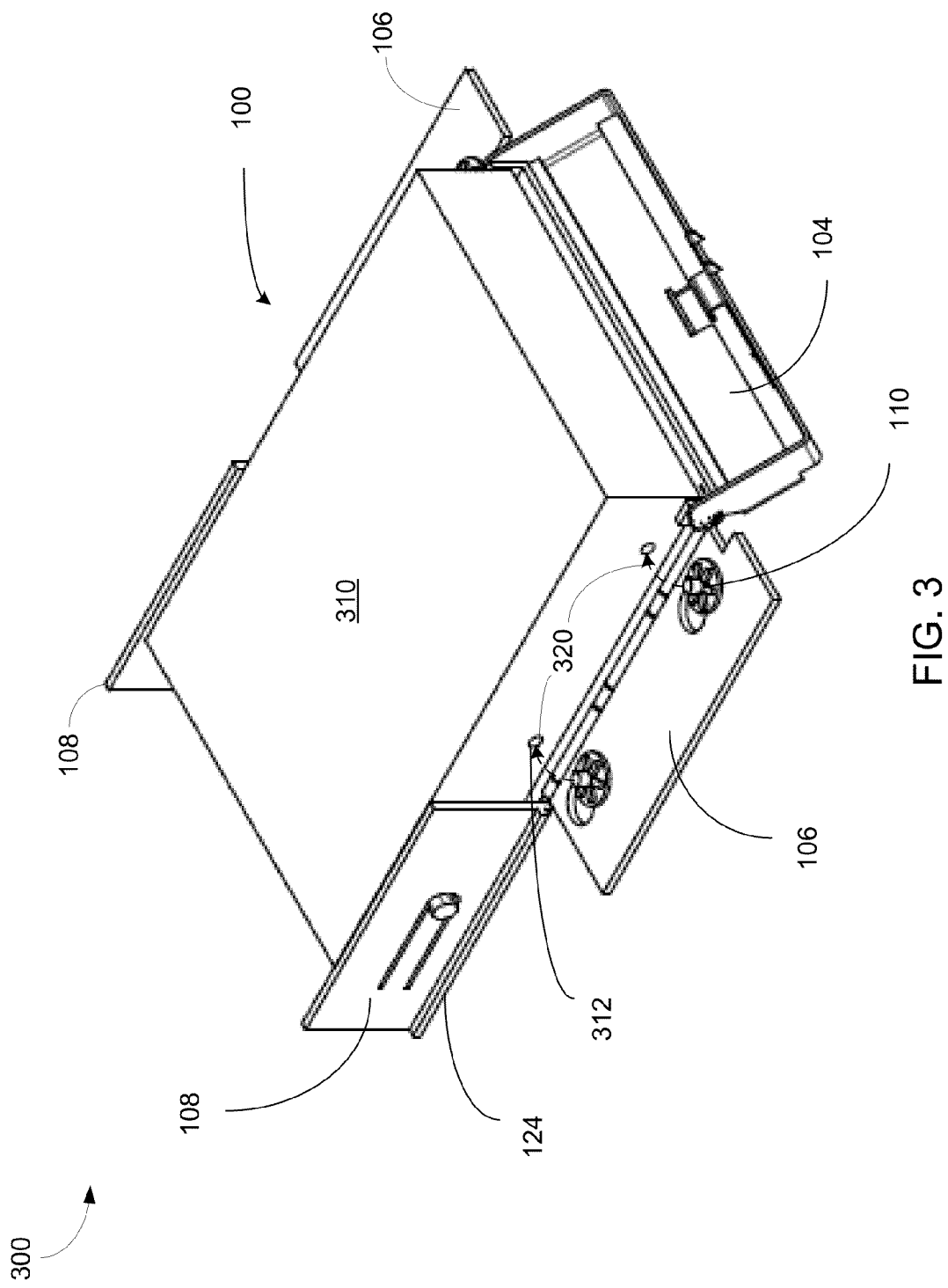
FIG. 3 is a diagram illustrating an inner cage carrying an HDD in accordance with embodiments of the present invention.

FIG. 3 is a diagram 300 illustrating an inner cage or HDD drawer 100 containing an HDD 310 in accordance with one embodiment of present invention. To receive HDD 310, front cover 104 is pulled outward disengaging from side panels 106. Side panels 106 are subsequently swung from its position approximately perpendicular to base plate (not shown in FIG. 3) to a position approximately parallel to base plate 102 for ease of placement or access of HDD 310. Fasteners 110 are placed or installed in side panels 106. Side panels 106, guide side plates 108, and front cover 104 provide a housing compartment for HDD 310 to seat HDD 310 within HDD drawer 100. When side panels 106 is in a position parallel to base plate 102, mounting holes 312 of HDD 310 are visible. Note that if side panels 106 are moved to their positions approximately perpendicular to base plate, portions of fasteners 110 will insert into mounting holes 312 as indicated by arrows 320 for locking HDD 310 with HDD drawer 100.

Figure 4:
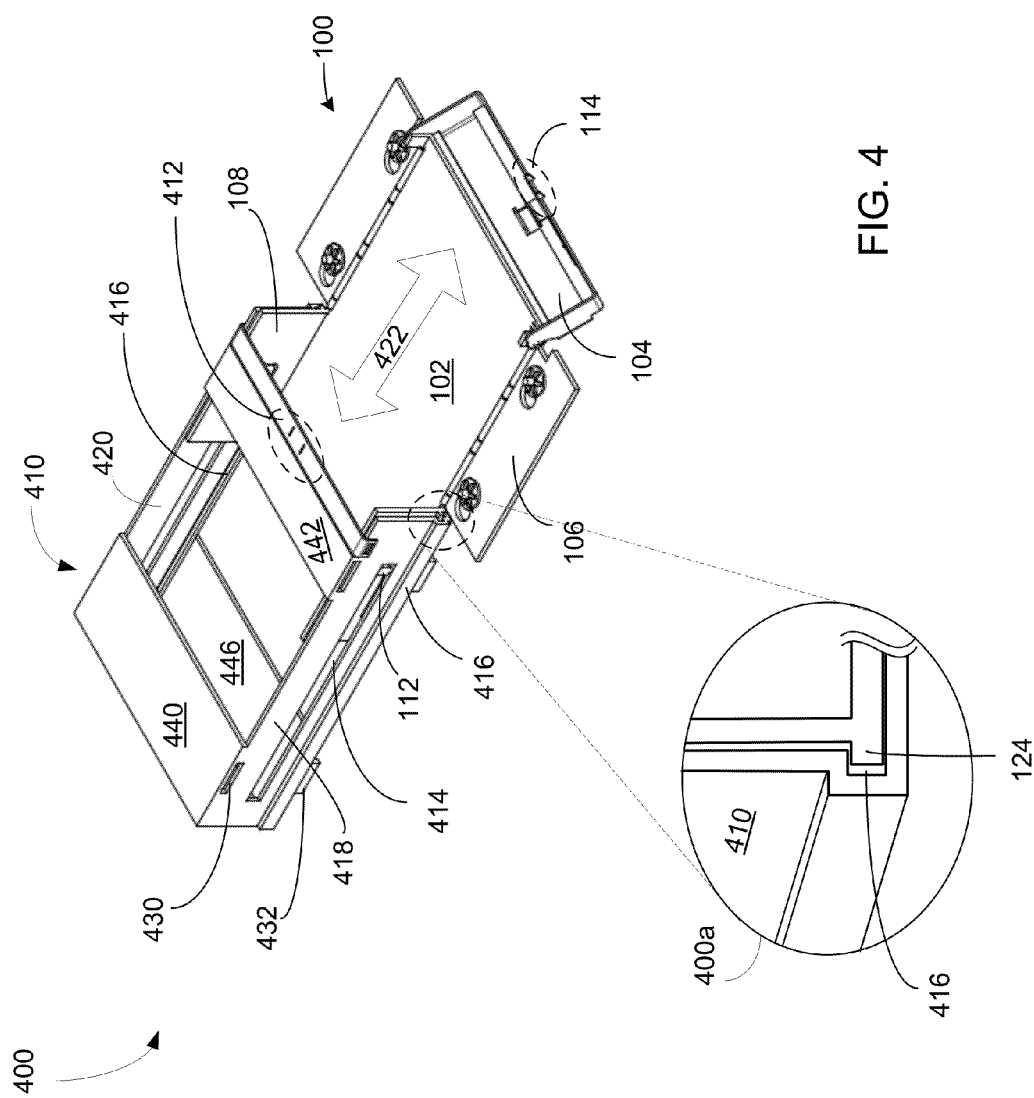
FIG. 4 is a diagram illustrating an HDD carrier including an outer frame casing and an inner cage in accordance with one embodiment of the present invention.

FIG. 4 is a diagram illustrating an HDD carrier 400 including an outer frame casing 410 and an inner cage 100 in accordance with one embodiment of the present invention. The diagram shows inner cage or drawer 100 inserted into outer frame casing 410 wherein drawer 100 is in a pulled-out position. Outer frame casing 410 is structured in a box configuration with an opening capable of receiving drawer 100. Outer frame casing 410, in one embodiment, includes side walls 418-420, top walls 440-442, and bottom wall 446. Side walls 418-420 include cut-through guide slots 414 and guide grooves 416. Top wall 443 includes a latching element 412 which is used to couple to front cover 104. When drawer or inner cage 100 and outer frame casing 410 are engaged, guide rails 124 and sliders 112 of inner cage 100 are engaged with guide grooves 416 and guide slot 414 of outer frame casing 410 respectively as shown in exploded drawing 400a.

During operation, slider 112 is configured to slide within guide slot 414 and it stops at the end of guide slot 414 which is designed to limit or prevent inner cage 100 from being accidentally separated or dropped from outer frame casing 410. When inner cage 100 is in pull-out position, side panels 106 are able to move from their closed positions which are approximately perpendicular to base plate 102 to their open positions which are approximately parallel to base plate 102. When side panels 106 are in their closed positions, inner cage 100 can move in directions indicated by double arrow 422. To secure inner cage 100 to outer frame casing 410, inner cage 100 is pushed in all the way until top latch 114 of front cover 104 can be clicked or latched with latching element 412 of outer frame casing.

Outer frame casing 410, in one aspect, further includes multiple stacking holes 430 and hooks 432 used to stack multiple HDD carriers 400 in a vertical direction which creates a stackable HDD carrier.

Figure 5A:
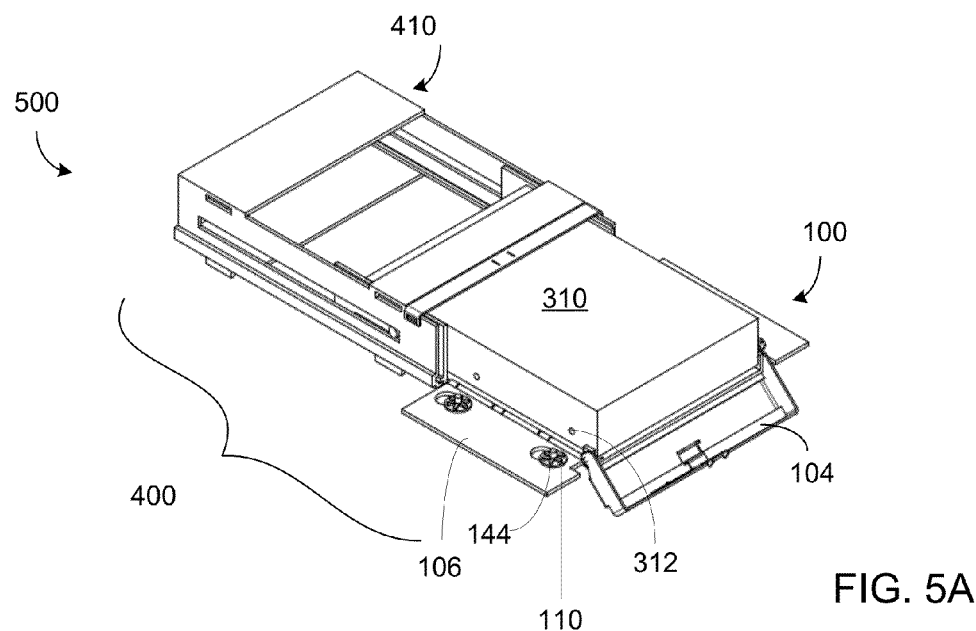
FIGS. 5A-C illustrates a process of installing an HDD in an HDD carrier in accordance with embodiments of the present invention.
Figure 5B:
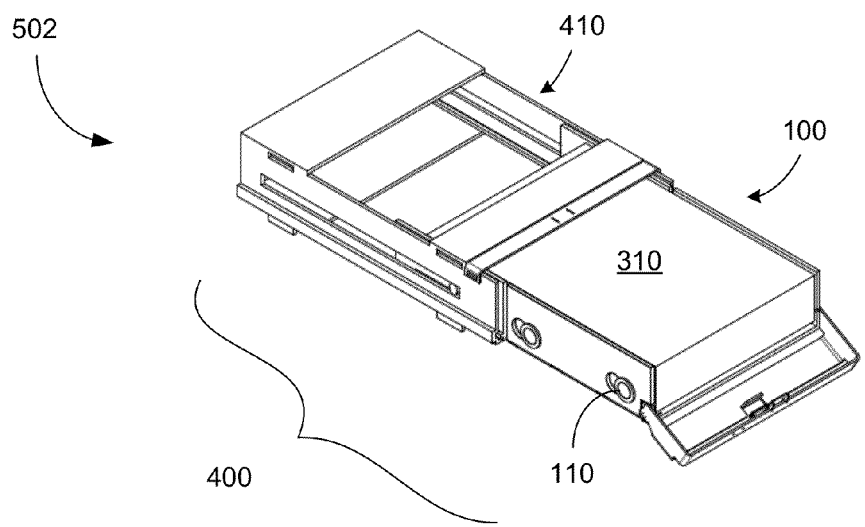
Figure 5C:
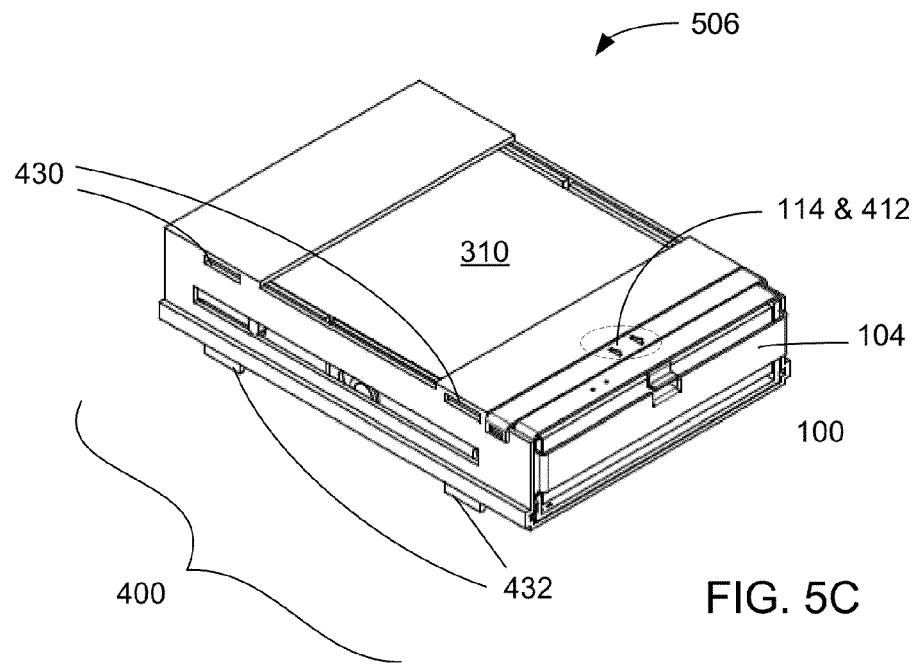

FIGS. 5A-C are diagrams 500-506 illustrating a process of installing an HDD in an HDD carrier in accordance with embodiments of the present invention. HDD carrier 400, illustrated in FIG. 5A, includes an outer frame casing 410, a drawer 100, and an HDD 310. Drawer 100 is physically coupled to outer frame casing 410. Drawer 100 shown in diagram 500 is in a pulled-out position which is also referred to as an open position. In an open position, both side panels 106 and front cover 104 are swung outward or moved away from HDD 310. Fasteners 110 are coupled to side panels 106 via openings. In one embodiment, fasteners 110 are positioned in such a way that when side panels 106 are retracted toward HDD 310 or are in closed positions, engaging pins 144 of fasteners 110 are inserted into mounting holes 312 of HDD 310 fixing HDD 310 to side panels 106.

When portions of fasteners 110 are firmly plugged into mounting holes 312 as illustrated in diagram 502 shown in FIG. 5B, HDD 310 is physically attached or anchored to drawer 100. The tight fit between engaging pin 144 of fastener 110 and mounting hole 312 of HDD 310 also provides vibration or shocking protections to HDDs. Once HDD 310 is secured, front cover 104 can be manually lifted whereby front cover 104 structurally reinforces side panels 106 by interlocking with each other. After pushing drawer 100 into outer frame casing 410, top latch 114 of front cover 104 latches onto latching element 412 wherein drawer 100 is seated inside of outer frame casing 410 as illustrated in FIG. 5C.

It should be noted that no additional parts such as screws or tools are required to assemble or install an HDD in carrier 400. Carrier 400 may be used as an individual storage unit with one HDD as shown in FIG. 5C.

Figure 6:
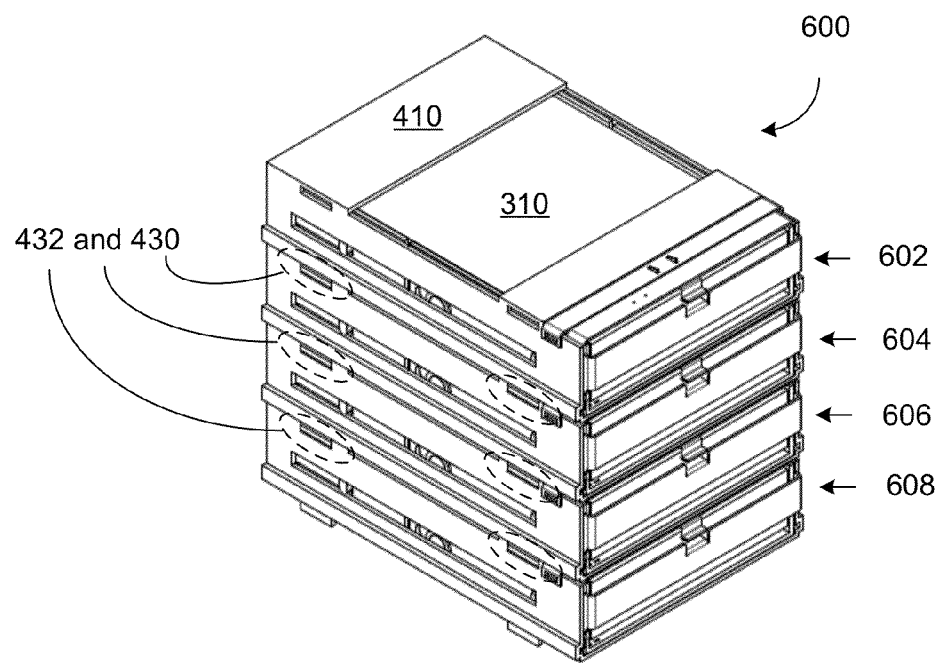
FIG. 6 is an exemplary diagram showing a carrier stack having four HDD carriers configured in a stacked configuration in accordance with one embodiment of the present invention.

FIG. 6 is an exemplary diagram showing a carrier stack 600 having four HDD carriers configured in a stacked configuration in accordance with one embodiment of the present invention. In one embodiment, stacking hooks 432 of carriers 602-608 and stacking holes 430 of carriers 602-608 are used to form a stack of carriers in a vertical direction. Carrier stack 600, in one example, is scalable whereby an HDD carrier can be optionally removed or added to the stack. Each HDD in carrier stack 600 can be independently replaced and/or adjusted without affecting operation of other carriers in stack 600.

Carrier stack 600 can be used as a mess storage device for a computer or network management system. An advantage of employing carrier stack 600 using drawers and push-in fasteners is that maintaining and accessing HDDs are relatively easier with minimal or no tool requirements. Another advantage of employing carrier stack 600 is to minimize requirement for spare parts such as screws and trays.

The exemplary embodiment of the present invention includes various processing steps, which will be described below. The steps of the embodiment may be embodied in machine, computer executable instructions, or manual procedures.

Figure 7:
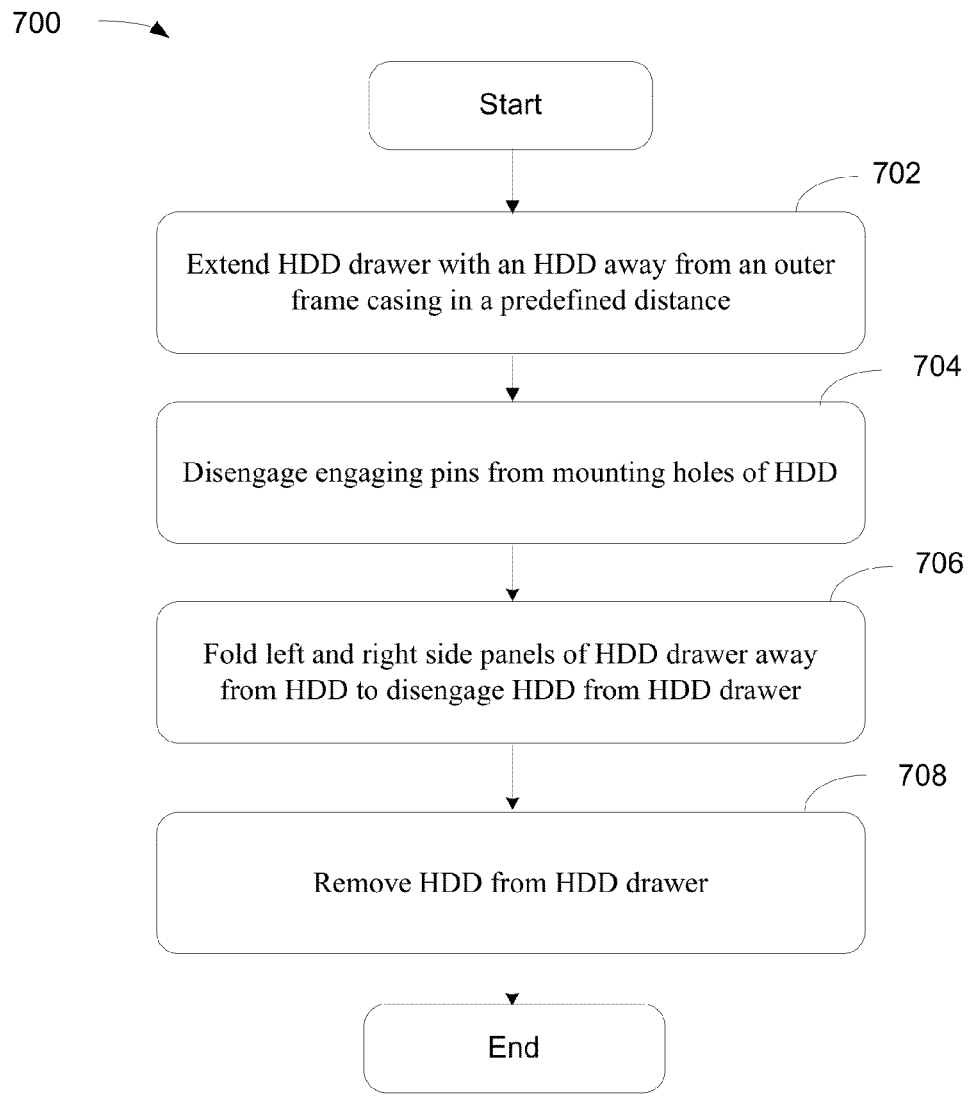
FIG. 7 is a flowchart illustrating a process of removing an HDD from an outer frame casing in accordance with one embodiment of the present invention.

FIG. 7 is a flowchart 700 illustrating a process of removing an HDD from an outer frame casing in accordance with one embodiment of the present invention. At block 702, a method of accessing an HDD is able to extend the HDD drawer with the HDD away from an outer frame casing in a predefined distance and disengage multiple engaging pins of multiple fasteners from mounting holes of the HDD at block 704. At block 706, the process folds the left and right side panels of the HDD drawer away from the HDD to disengage the HDD from the HDD drawer.

At block 708, the HDD is removed from the HDD drawer. The process is further capable of inserting a new HDD into the HDD drawer and lifting the left and right side panels of the HDD drawer toward sides of the new HDD. After aligning at least a portion of engaging pins with a portion of mounting holes of the new HDD, at least a portion of engaging pins is pushed into the mounting holes of the new HDD to attach the new HDD to the HDD drawer. The HDD drawer is subsequently pushed into the outer frame casing. Noted that predefined openings on the left and right side panels are aligned with the mounting holes of the new HDD. Also, a portion of an engaging pin may be inserted into a mounting hole which has preexisting threads capable of receiving a threaded screw for fastening.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A device for housing a hard-disk drive ("HDD"), comprising:
    an inner cage having a base plate, a front cover, two guide side plates, a first side panel, and a second side panel, the front cover having a top latch and pivotally attached to the base plate, the first side panel hinged to a first side of the base plate and the second side panel hinged to a second side of the base plate, wherein the first and second sides of the base plate are situated at two opposite sides of the base plate, wherein the guide side plates are situated adjacent to the first and the second side panels for controlling sliding distance of the inner cage, wherein the inner cage is configured to house an HDD, wherein the first and second side panels include a plurality of fasteners for securing the HDD to the inner cage, the fastener having two disks and an engaging pin, wherein the two disks are configured to couple to the first side panel and the engaging pin provides shock protection to the HDD; and
    an outer frame casing configured to receive the inner cage via its two opposite guiding walls, wherein the guiding walls are configured to allow extending the inner cage to a predefined distance from the outer frame casing for accessing the HDD.

2. The device of claim 1, wherein each guide side plate is affixed substantially perpendicular to the base plate, each guide side plate including a slider and a guide rail for providing coupling mechanism between the inner cage and the outer frame casing.

3. The device of claim 2, wherein each of the guiding walls includes a guide slot and a guide groove configured to engage with the slider and the guide rail respectively to facilitate sliding movements of the inner cage.

4. The device of claim 3, wherein the sliders of the guiding walls includes a slider header and a spring-loaded release, the slider header coupled to the guide slot of outer frame casing and configured to provide a predefined distance for the inner cage to expend from the outer frame casing, the spring-loaded release able to detach the inner cage from the outer frame casing.

5. The device of claim 3, wherein the front cover includes a latch release configured to unlatch top latch from the outer frame casing, the front cover coupled to the base plate via a pivot coupling element, the pivot coupling element includes a torsion spring for facilitating opening or closing of the front cover.

6. The device of claim 1,
    wherein each of the first and second side panels includes a plurality of installation holes configured to house fasteners;
    wherein each of the fasteners includes an engaging pin which is configured to allow the engaging pin to be pushed into a mounting hole of the HDD for securing the HDD to the inner cage.

7. The device of claim 1, wherein the guiding walls are configured to guide the inner cage having the HDD to slide inside of the outer frame casing to a secure position.

8. The device of claim 1, wherein the extending the inner cage to a predefined distance from the outer frame casing is a position in which the HDD is inserted.

9. The device of claim 1, wherein the outer frame casing includes stacking holes and stacking hooks capable of stacking a plurality of the HDDs in a stack configuration.

10. A memory device for storing information, comprising:
   a hard-disk drive ("HDD") having a plurality of mounting holes on its side walls; and
   a HDD drawer configured to housing the HDD and having a base plate, a front cover, a left side panel, a right side panel, a left guide side plate, and a right guide side plate; wherein the front cover is coupled to front side of the base plate, wherein the left side panel is flexibly attached to left side of the base plate adjacent to the front cover; wherein the right side panel is flexibly attached to right side of the base plate adjacent to the front cover; wherein the left and right side panels are optionally moved from a mounting position in which the left and right side panels are substantially perpendicular to the base plate to a dismounting position in which the left and right side panels are substantially parallel to the base plate; wherein the left and the right side panels are situated adjacent to the left and the right side panels for controlling sliding distance of the HDD drawer, the left and right side panels including fasteners wherein each fastener includes two disks and an engaging pin, wherein the two disks are configured to couple to the right or left side panel and the engaging pin provides shock protection to the HDD.

11. The device of claim 10, wherein the left guide side plate is affixed perpendicular to the left side of base plate adjacent to the left side panel; wherein the right guide side plate is affixed perpendicular to the right side of base plate adjacent to the right side panel.

12. The device of claim 11, further comprising an outer frame casing configured to housing one or more HDD drawers in a stacking configuration.

13. The device of claim 12, wherein the outer frame casing includes a plurality of left and right guiding walls wherein a left guiding wall is coupled to the left guide side plate of the HDD drawer and a right guiding wall is coupled to the right guide side plate of the HDD drawer for guiding the HDD drawer to slide in and out of the outer frame casing.

14. The device of claim 13, wherein the left and right side panels include a plurality of fasteners wherein the left and right side panels are attached to the HDD by inserting pins of the faster buttons into the mounting holes of the HDD.

15. The device of claim 14, wherein the outer frame casing is configured to allow the HDD drawer to extend a predefined distance away from the outer frame casing for installing the HDD.

16. A method of mounting a hard-disk drive ("HDD") to a HDD drawer, comprising:
   extending the HDD drawer with the HDD away from an outer frame casing in a predefined distance managing by guide side plates;
   having two disks and an engaging pin, wherein the two disks are configured to couple to the first side panel and the engaging pin provides
   disengaging a fastener having two disks and an engaging pin from the HDD by removing the engaging pin from a mounting hole of the HDD, the engaging pin made of shock-absorbing material providing shock protection to the HDD;
   folding left and right side panels of the HDD drawer away from the HDD to disengage the HDD from the HDD drawer; and
   removing the HDD from the HDD drawer.

17. The method of claim 16, further comprising:
   inserting a new HDD into the HDD drawer;
   lifting the left and right side panels of the HDD drawer toward sides of the new HDD;
   aligning at least a portion of the plurality of engaging pins with a portion of plurality of mounting holes of the new HDD;
   pushing at least a portion of the plurality of engaging pins into the mounting holes of the new HDD to attach the new HDD with the HDD drawer; and
   sliding the HDD drawer into the outer frame casing.

18. The method of claim 17, wherein aligning at least a portion of the plurality of engaging pins with a portion of plurality of mounting holes of the new HDD includes aligning predefined openings on the left and right side panels with the mounting holes of the new HDD.

19. The method of claim 16, wherein pushing at least a portion of the plurality of engaging pins into the mounting holes of the new HDD includes inserting a portion of an engaging pin into a mounting hole which has threads capable of receiving a threaded screw for fastening.

* * * * *